United States Patent Office 2,925,411
Patented Feb. 16, 1960

2,925,411

CHEMICAL COMPOUNDS

Charles H. Stammer, Clark, N.J.

No Drawing. Application April 29, 1958
Serial No. 731,605

15 Claims. (Cl. 260—210)

This invention relates to antibiotic substances and methods of synthesizing the same. More particularly, it is concerned with the synthesis of novobiocin and dihydronovobiocin starting with 2,4-dihydroxy-3-methylphenacylamine.

Novobiocin is a new antibiotic obtained by fermentation of *Streptomyces spheroides*. Novobiocin inhibits the growth of various gram-positive and a few gram negative organisms, staphylococci being the most sensitive. Novobiocin is used in the treatment of infections resistant to other antimicrobial agents. Its use has included the treatment of cellulitis, recurrent and persistent carbuncles, various skin abscesses, postoperative wound infections, and the like.

Dihydronovobiocin and its salts are at least as active and, in most instances, more active than novobiocin against test microorganisms, particularly against important disease-producing types. For example, dihydronovobiocin exhibits more than two-fold improvement in activity against two of them, *C. pseudotuberculosis* 545 and *C. pseudodiphtherificum* 259. Dihydronovobiocin, when compared with novobiocin is significantly more active in vivo against infections with Proteus sp., *Micrococcus pyogenes* var. *aureus* Smith, *Streptococcus pyogenes* and *Diplococcus pneumoniae*, erythromycin resistant.

It is an object of the present invention to provide processes for the production of novobiocin and dihydronovobiocin starting with 2,4-dihydroxy-3-methylphenacylamine. Another object is to provide new intermediate products useful in the synthesis of novobiocin and dihydronovobiocin. Other objects will be apparent from the detailed description of this invention hereinafter provided.

In accordance with the present invention, it is now found that novobiocin and dihydronovobiocin can be prepared from 2,4-dihydroxy-3-methylphenacylamine by a process which may be shown as follows:

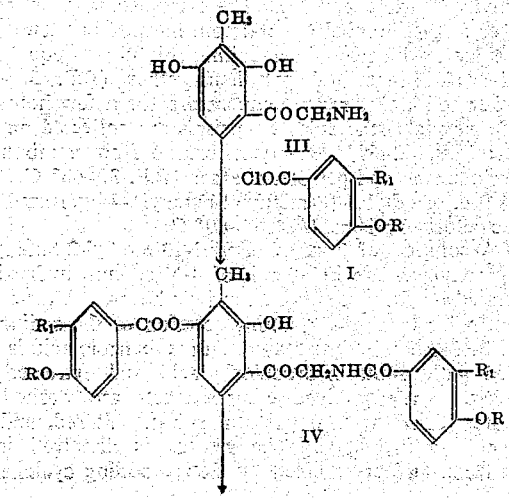

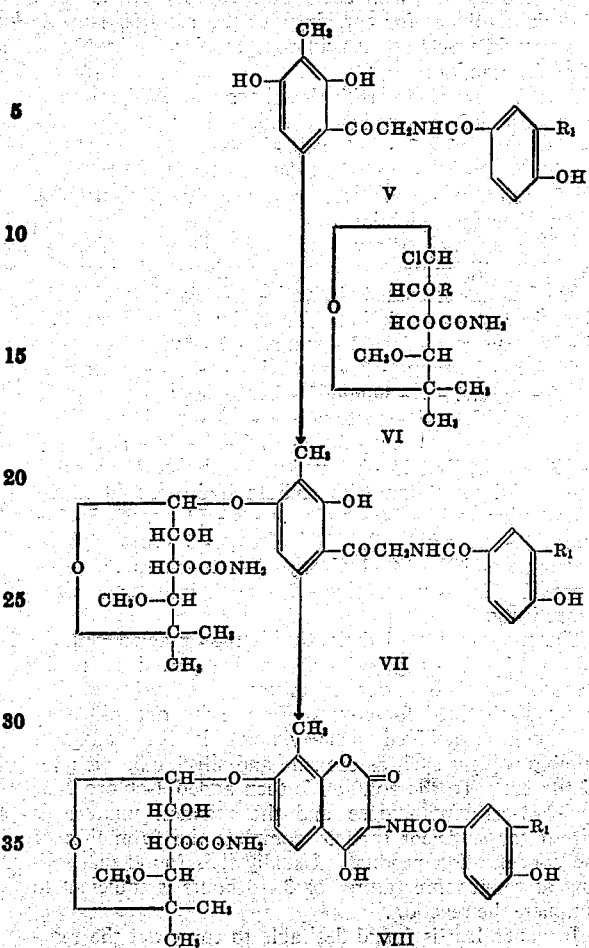

wherein R is a lower alkanoyl radical, and $R_1$ is
$CH_2-CH=C(CH_3)_2$ or $CH_2-CH_2-CH(CH_3)_2$ In accordance with the above-described reactions, the starting phenacylamine compound (III) is reacted with the acylating agent to form the corresponding diacyl derivative (IV), this compound is then hydrolyzed in aqueous alkaline solutions to produce the corresponding mono acyl derivative (V). The latter compound is reacted with 1-chloro-2-O-acyl-3-O-carbamylnoviose (VI) in the presence of silver oxide to produce the N-acyl-4-carbamylnoviose derivative (VII), and this compound is reacted with a lower alkyl carbonate in the presence of an alkali metal to form novobiocin or dihydronovobiocin.

The first step of this process is effected by intimately contacting the starting material with the substituted benzoic acid chloride to produce the diacylated compound (IV). Thus, this reaction is conveniently effected by reacting the phenacylamine with the substituted benzoic acid chloride in the presence of an acid acceptor. Although various bases are suitable for use as acid acceptors in the acylation process, the tertiary amines such as diethylaminobenzene, pyridine, and the like are particularly suitable, and the use of such acid acceptors are preferred in carrying out the processes of my invention.

In carrying out this first step of my process, I find that the acylation is most conveniently carried out by intimately contacting the acylating agent and the acid acceptor with the phenacylamine compound at room temperature for sufficient time, for example overnight, to complete the formation of the diacylated phenacylamine.

After the reaction is complete the product can be recovered by evaporating the reaction mixture to dryness and crystallizing the residue from a suitable solvent such as ethyl acetate. The acid acceptor such as pyridine is a convenient solvent for carrying out the reaction and at the same time acts as an acid acceptor for the by-product of the reaction.

Thus, in accordance with the above-described process, 2,4-dihydroxy-3-methylphenacylamine is reacted with 3 - (3 - methyl - 2 - butenyl) - 4 - acyloxy - benzoyl chloride or 3 - (3 - methylbutyl) - 4 - acyloxy - benzoyl chloride to produce the corresponding disacylate derivatives of the phenacylamine.

In the next step of my process, the diacylated derivative of 2,4-dihydroxy-3-methylphenacylamine is converted to the monoacylated derivative by reaction with an alkali in aqueous solution. Thus, by this process the N - [4 - acetoxy - 3 - (3 - methyl - 2 - butenyl) - benzoyl] - 2 - hydroxy - 3 - methyl - 4 - (4 - acetoxy - 3 - [3 - methyl - 2 - butenyl] - benzoyloxy) - phenacylamine and N - [4 - acetoxy - 3 - (3 - methylbutyl) - benzoyl] - 2 - hydroxy - 3 - methyl - 4 - (4 - acetoxy - 3 - [3 - methyl butyl] - benzoyloxy) - phenacylamine are converted by reaction with sodium hydroxide in aqueous solution to N - [4 - hydroxy - 3 - (3 - methyl - 2 - butenyl) - benzoyl] - 2,4 - dihydroxy - 3 - methylphenacylamine and N - [4 - hydroxy - 3 - (3 - methylbutyl) - benzoyl] - 2,4 - dihydroxy - 3 - methylphenacylamine, respectively.

The mono acylated derivative is then reacted with 1-chloro - 2 - O - acyl - 3 - O - carbamylnoviose in the presence of silver oxide to produce the corresponding acylated etherified compound. In carrying out this process the monoacylated phenacylamine is dissolved in a suitable solvent such as dioxane and silver oxide is added thereto. To the solution is then added 1-chloro-2-O-acyl-3-O-carbamylnoviose and the reaction mixture is stirred for sufficient time to complete the formation of the condensation product. Usually it is found that stirring at room temperature for 3–10 hours is sufficient to complete the reaction.

In general, it is found desirable to carry out the reaction in the absence of light and under substantially anhydrous conditions in order to obtain optimum yields of the desired reaction product. Also, it is found that the reaction proceeds more rapidly if a small amount of iodine is added to the reaction mixture, although the addition of iodine is not essential to the condensation reaction.

After completion of the condensation reaction, the acyl substituent of the noviose moiety is readily removed by hydrolysis with alkali. Thus, after filtering the reaction mixture to remove insoluble by-products and following reduction of the excess iodine with sodium bisulfite, the filtrate is concentrated to a small volume at reduced pressure and treated with sodium hydroxide to a pH of about 7 which hydrolyzes off the acyl substituent of the noviose moiety. Thus, in accordance with this process, N - [4 - hydroxy - 3 - (3 - methyl - 2 - butenyl) - benzoyl] - 2,4 - dihydroxy - 3 - methylphenacylamine and N - [4 - hydroxy - 3 - (3 - methylbutyl) - benzoyl] - 2,4 - dihydroxy - 3 - methylphenacylamine are converted to N - (4 - hydroxy - 3 - [3 - methyl - 2 - butenyl] - benzoyl) - 2 - hydroxy - 3 - methyl - 4 - (3 - O - carbamylnoviosyloxy) - phenacylamine and N - (4 - hydroxy - 3 - [3 - methylbutyl] - benzoyl) - 2 - hydroxy - 3 - methyl - 4 - (3 - O - carbamylnoviosyloxy)phenscylamine, respectively.

The final step of my process, the formation of novobiocin and dihydronovobiocin, is accomplished by reacting the noviosephenacylamine derivative with a lower alkyl carbonate in the presence of an alkali metal. In this reaction any of the various lower alkyl carbonates such as methyl carbonate, ethyl carbonate, propyl carbonate and the like are used, although I prefer to use ethyl carbonate which is readily available and acts as a good solvent for carrying out the reaction. Further, I prefer to use powdered sodium as the alkali metal in this reaction, since it is relatively inexpensive and most convenient to use.

The reaction is conveniently effected by warming the solution of the phenacylamine derivative with ethyl carbonate in the presence of sodium for a short time, destroying any excess of sodium by the addition of a lower ethanol such as methanol and ethanol, extracting the reaction mixture with water, and acidifying the resulting alkaline aqueous extract whereupon the desired novobiocin compound precipitates from solution.

The following examples are presented as illustrative embodiments of the methods of carrying out this invention.

EXAMPLE 1

*Preparation of N - [4 - acetoxy - 3 - (3 - methyl - 2 - butenyl) - benzoyl] - 2 - hydroxy - 3 - methyl - 4 - (4 - acetoxy - 3 - [3 - methyl - 2 - butenyl] -benzoyloxy)-phenacylamine*

To a cold solution of 5.4 g. of 4-acetoxy-3-(3-methyl-2-butenyl)-benzoyl chloride in 25 ml. of pyridine is added 2.2 g. of 2,4-dihydroxy-3-methylphenacylamine hydrochloride. The mixture is allowed to come to room temperature and evoporated to dryness in vacuo. The addition of water to the residue gives a slurry of solid which is collected on a filter. Recrystallization of this product from ethyl acetate gives N-[4-acetoxy-3-(3-methyl - 2 - butenyl) - benzoyl] - 2 - hydroxy - 3 - methyl - 4 - (4 - acetoxy - 3 - [3 - methyl - 2 - butenyl]-benzoyloxy)-phenacylamine as a crystalline solid.

The 4 - acetoxy - 3 - (3 - methyl - 2 - butenyl) - benzoyl chloride used in the above-described process can be prepared as follows:

A mixture of 7 g. of sodium metal cut into small pieces, 300 ml. of dry toluene, and 50 g. of ethyl p-hydroxybenzoate is heated under reflux and stirred for a few hours. The mixture is cooled in an ice bath and stirred while 50 g. of γ,γ-dimethylallyl bromide is added dropwise during a period of two hours. The reaction mixture is stirred for fifteen hours at room temperature and then warmed to 50° C. for one-half hour. After filtration to remove sodium bromide, the toluene solution is concentrated under reduced pressure to 100 ml. and extracted three times with 100 ml. portions of 2.5 N sodium hydroxide. The alkaline extracts are combined, cooled to 0° C. and carefully acidified to pH 6 with 2 N sulfuric acid. The heavy oil which separated is extracted with ether, dried over magnesium sulfate and concentrated in vacuo; weight 42 g. This oil is dissolved in cyclohexane and extracted with a saturated solution of sodium carbonate to remove some unreacted ethyl p-hydroxybenzoate. The cyclohexane layer is dried over magnesium sulfate and concentrated in vacuo. The residue is dissolved in a boiling mixture of equal parts of cyclohexane and petroleum ether (B.P. 30–60°). After cooling at room temperature for a few hours and 3° overnight, the colorless prisms are collected on a filter; M.P. 62–66°. Recrystallization from a mixture of cyclohexane and petroleum ether (B.P. 30–60° C.) gives 18.9 g. of ethyl 3-(3-methyl-2-butenyl)-4-hydroxy benzoate colorless prisms; M.P. 66–69° C.

A solution of 7 g. of ethyl 3-(3-methyl-2-butenyl)-4-hydroxybenzoate in 30 ml. of 4-N sodium hydroxide is heated on the steam cone for four hours. After cooling in an ice bath, the resulting solution of the sodium salt of 3-(3-methyl-2-butenyl)-4-hydroxybenzoic acid is acidified with dilute hydrochloric acid and extracted with ether. The combined ether extracts are washed with water, dried over magnesium sulfate, filtered, and concentrated in vacuo. The residue is dissolved in hot benzene and crystallized by slowly adding cyclohexane;

M.P. 80–84°. Recrystallization from a mixture of benzene and cyclohexane gives colorless prisms; M.P. 87–89°. Several recrystallizations from benzene gives prisms melting at 94–95° C. The 3-(3-methyl-2-butenyl)-4-hydroxybenzoic acid can be purified by dissolving it in a solution of sodium carbonate and extracting with ether. After acidifying the ice cold sodium carbonate solution with hydrochloric acid, the product is collected on a filter and washed with cold water. Recrystallization from a mixture of methanol and water gives colorless needles; M.P. 101–103° C.

A solution of 20.6 g. (0.1 mole) of 3-(3-methyl-2-butenyl)-4-hydroxybenzoic acid in 100 ml. of dry pyridine is treated with 12.8 g. (0.125 mole) of acetic anhydride and kept at room temperature overnight. The reaction mixture is diluted with 400 ml. of ice and water and acidified with concentrated hydrochloric acid. The precipitated product is removed by filtration. The crude product is recrystallized from petroleum ether (B.P. 85–100°) to yield purified 3-(3-methyl-2-butenyl)-4-acetoxybenzoic acid.

A suspension of 24.8 (0.1 mole of 3-(3-methyl-2-butenyl)-4-acetoxybenzoic acid in 50 ml. of water is treated with 40 ml. of 2.5 N sodium hydroxide. The resultant solution is lyophilized to yield a residue of sodium 3-(methyl-2-butenyl)-4-acetoxybenzoate. The sodium salt is added portionwise with stirring at ice temperature to a solution of 127 g. (1 mole) of oxalyl chloride in 400 ml. of dry benzene. After the final addition, stirring is continued for about 2 hours. The precipitated sodium chloride is removed and the filtrate is concentrated at reduced pressure. The residue is redissolved in benzene and reconcentrated to remove last traces of oxalyl chloride from the 3-(3-methyl-2-butenyl)-4-acetoxybenzoyl chloride.

EXAMPLE 2

When 4-acetoxy-3-(3-methylbutyl) benzoyl chloride is reacted with 2,4-dihydroxy-3-methylphenacylamine hydrochloride following the process described in Example 1, N-[4-acetoxy-3-(3-methylbutyl)-benzoyl]-2-hydroxy-3-methyl-4-(4-acetoxy-3-[3-methylbutyl]-benzoyloxy)-phenacylamine is obtained.

The starting material, 4-acetoxy-3-(3-methylbutyl)-benzoylchloride can be prepared as follows:

A solution of 3 g. of ethyl 3-(3-methyl-2-butenyl)-4-hydroxybenzoate in 50 ml. of ethanol is hydrogenated over 0.5 g. of platinum oxide catalyst. The theoretical amount of hydrogen is taken up within one hour. After removal of the catalyst by filtration, the alcohol is distilled under reduced pressure. The ethyl 3-(3-methylbutyl)-4-hydroxybenzoate is dissolved in 20 ml. of 4 N sodium hydroxide and heated on the steam cone for four hours. After acidification with hydrochloric acid, the mixture is extracted with ether. The ether extract was dried over magnesium sulfate, filtered, and concentrated in vacuo. The residue is dissolved in hot benzene and cyclohexane is added. After cooling the 3-(3-methylbutyl)-4-hydroxybenzoic acid is collected on a filter. Recrystallization from a mixture of chloroform and cyclohexane gives colorless needles; M.P. 108–9° C.

A mixture of 10.4 g. (0.005 mole) of 3-(3-methylbutyl)-4-hydroxybenzoic acid (VI-A) and 50 ml. of pyridine is treated with 10 ml. of acetic anhydride. The mixture is kept at room temperature overnight. The mixture is poured into 300 ml. of ice and water. The resultant mixture is acidified to about pH 2 with concentrated hydrochloric acid. The precipitated product is removed and purified by recrystallization from petroleum ether (B.P. 85–100°).

A mixture of 13 g. (0.05 mole) of 3-(3-methylbutyl)-4-acetoxybenzoic acid (VII-A) and 50 ml. of thionyl chloride is kept at room temperature overnight. The solution is concentrated at reduced pressure. The residue is dissolved in 50 ml. of dry benzene and reconcentrated at reduced pressure to yield a residue of 3-(3-methylbutyl)-4-acetoxybenzoyl chloride.

EXAMPLE 3

*N - 4 - hydroxy - 3 - [3 - methyl - 2 - butenyl] - benzoyl-2,4-dihydroxy-3-methylphenacylamine*

A solution of 5 g. of N-4-acetoxy-3-[3-methyl-2-butenyl] - benzoyl) - 2 - hydroxy - 3 - methyl - 4 - (4-acetoxy - 3 - [3 - methyl - 2 - butenyl] - benzoyloxyphenacylamine in 25 ml. of 2.5 N sodium hydroxide is allowed to stand at room temperature for three hours. On acidification of the solution N-(4-hydroxy-3-[3-methyl-2-butenyl] - benzoyl) - 2,4 - dihydroxy - 3 - methylphenacylamine precipitates as a crystalline solid.

EXAMPLE 4

*N - (4 - hydroxy - 3 - [3 - methylbutyl] - benzoyl) - 2,4-dihydroxy-3-methylphenacylamine*

A solution of 5 g. of N-(4-acetoxy-3-[3-methylbutyl]-benzoyl) - 2 - hydroxy - 3 - methyl - 4 - (4 - acetoxy - 3-[3-methylbutyl] benzoyloxyphenacylamine in 25 ml. of 2.5 N sodium hydroxide is allowed to stand at room temperature for three hours. On acidification of the solution N-(4-hydroxy-3-[3-methylbutyl]-benzoyl)-2,4-dihydroxy-3-methylphenacylamine precipitates as a crystalline solid. This compound when recrystallized from aqueous ethanol melts at 217–220° C.

EXAMPLE 5

*Preparation of N-(4-hydroxy-3-[3-methyl-2-butenyl]-benzoyl) - 2 - hydroxy - 3 - methyl - 4 - (3 - O - carbamylnoviosyloxy)-phenacylamine*

To a solution of 3.68 g. of N-(4-hydroxy-3-[3-methyl-2 - butenyl] - benzoyl) - 2,4 - dihydroxy - 3 - methylphenacylamine in dioxane is added a dioxane solution of 4.8 g. of 1-chloro-2-O-acetyl-3-O-carbamylnoviose. An excess of silver oxide is added and the mixture is stirred three to ten hours. The silver halide is then filtered off and filtrate is evaporated to dryness. One equivalent of aqueous alkali is added to the residue and the mixture is filtered. The filtrate is neutralized with acetic acid and the precipitated product, N-(4-hydroxy-3 - [3 - methyl - 2 - butenyl] - benzoyl) - 2 hydroxy - 3-methyl - 4 - (3 - carbamyl - 4 - methylnoviosyloxy)-phenacylamine is purified by recrystallization.

The 1-chloro-2-O-acetyl-3-O-carbamylnoviose used in the above-described process can be prepared from 3-O-carbamylnoviose by processes described in the co-pending application of Edward Walton and Claude Spencer, Serial No. 705,139, filed December 26, 1957. In this process the 3-O-carbamylnoviose is reacted with acetic anhydride in the presence of sodium acetate at 100° C. for about one hour to form the diacetylated derivative which is then reacted with anhydrous hydrogen chloride in ethyl ether to produce 1-chloro-2-O-acetyl-3-O-carbamylnoviose. This reaction can be shown as follows:

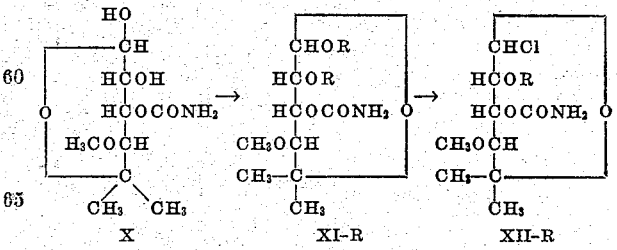

The 3-O-carbamylnoviose can be prepared starting with methyl 2,3-isopropylidene-L-rhamnofuranoside by procedures described in detail in the copending application of Edward Walton, Serial No. 705,110, filed December 26, 1957, and the copending application of Clifford Shunk and Karl Folkers, Serial No. 705,113 filed December 26, 1957. Thus, by procedures shown in Serial No. 705,110 methyl 2,3-isopropylidene-L-rhamnofuranoside is converted to methyl α-noviopyranoside by the following reactions:

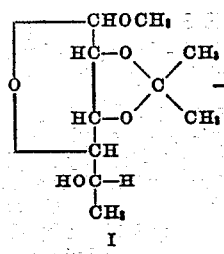

I
Methyl 2,3-isopropylidene-L-rhamnofuranoside

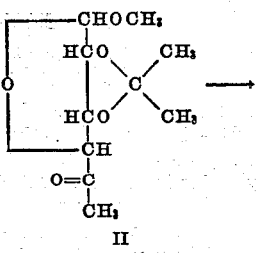

II
Methyl 2,3-isopropylidene-5-keto-L-rhamnofuranoside

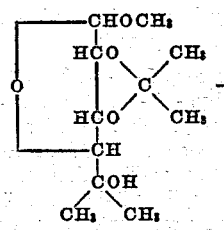

III
Methyl 5,5-dimethyl-2,3-isopropylidene-L-lyxofuranoside

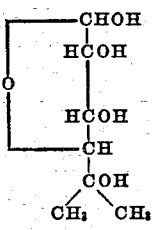

IV
5,5-dimethyl-L-lyxose

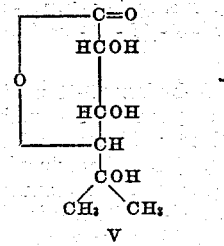

V
5,5-dimethyl-L-lyxono-γ-lactone

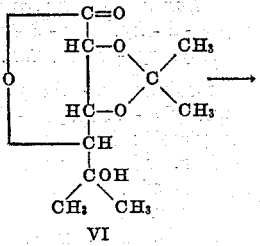

VI
5,5-dimethyl-2,3-isopropylidene-L-lyxono-γ-lactone

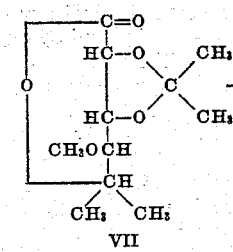

VII
2,3-isopropylidene-noviono-δ-lactone

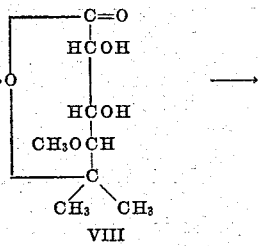

VIII
Noviono-δ-lactone

IX
Noviopyranoside

X
Methyl α-noviopyranoside

Xa
Methyl β-noviopyranoside

In the foregoing depicted reactions the starting material is first reacted with an oxidizing agent to produce methyl 2,3-isopropylidene-5-keto-L-rhamnofuranoside, which upon reaction with a methyl magnesium halide, is converted to methyl 5,5-dimethyl-2,3-isopropylidene-L-lyxofuranoside. This latter compound is then hydrolyzed by reaction with a non-oxidizing inorganic acid to obtain 5,5-dimethyl-L-lyxose which is then oxidized to produce 5,5-dimethyl-L-lyxono-γ-lactone. Conversion of 5,5-dimethyl-L-lyxono-γ-lactone to the corresponding 2,3-isopropylidene derivative and methylation of the sodium salt of this intermediate results in the production of 2,3-isopropylidenenoviono-δ-lactone. Upon hydrolyzing 2,3-isopropylidene-noviono-δ-lactone with a non-oxidizing inorganic acid noviono-δ-lactone is obtained. When noviono-δ-lactone is reduced by reaction with suitable reducing agents noviopyranoside is obtained, which upon methylation is converted to a mixture of methyl α-noviopyranoside and methyl β-noviopyranoside. The mixture of methyl α-noviopyranoside and methyl β-noviopyranoside can then be separated by fractional crystallization from suitable solvent mediums to produce methyl α-noviopyranoside and methyl β-noviopyranoside.

In accordance with the processes described in Serial No. 705,113 the methyl α-noviopyranoside can be converted to 3-O-carbamylnoviose by the following processes:

In the foregoing reaction scheme the methyl α-noviopyranoside is reacted with phosgene in the presence of pyridine to obtain methyl α-noviopyranoside 2,3-carbonate. Reaction of this compound with ammonia in methanol solution affords methyl 3-O-carbamyl-α-noviopyranoside. Hydrolysis of the latter product by reaction with hydrochloric acid in aqueous solution until the rotation of the solution remains constant affords 3-O-carbamylnoviose.

EXAMPLE 6

*Preparation of N - (4 - hydroxy-3-[3-methylbutyl]-benzoyl) - 2 - hydroxy-3-methyl-4-(3-O-carbamylnoviosyloxy)-phenacylamine*

When 4-(4-hydroxy-3-[3-methylbutyl]-benzoyl) - 2,4-dihydroxy-3-methylphenacylamine is reacted with 1-chloro-2-O-acetyl-3-O-carbamylnoviose in the presence of silver oxide in dioxane, and the reaction product worked up as described in Example 5, N-(4-hydroxy)-3-[3-methylbutyl] - benzoyl) - 2 - hydroxy - 3 - methyl - 4 - (3 - O-carbamylnoviosyloxy) phenacylamine is obtained.

EXAMPLE 7

*Preparation of novobiocin*

A solution of 1.5 g. of N-(4-hydroxy-3-[3-methyl-2-butenyl] - benzoyl) - 2 - hydroxy-3-methyl-4-(3 -O- carbamylnoviosyloxy)-phenacylamine in 40 ml. of ethyl carbonate is added to 2.5 g. of powdered sodium. The mixture is warmed on a steam bath for ten minutes, methanol is added to destroy the excess sodium and the product is extracted into 30 ml. of water. Neutralization of the solution gives a precipitate of novobiocin.

EXAMPLE 8

*Preparation of dihydronovobiocin*

Following the procedures described in Example 7 above, N-(4-hydroxy-3-[3-methylbutyl] - benzoyl)-2-hydroxy-3-methyl-4- (3-O-carbamylnoviosyloxy) - phenacylamine is reacted with ethyl carbonate in the presence of sodium to produce dihydronovobiocin; the product being recovered in accordance with the methods described above.

Various changes and modifications may be made in carrying out the present invention without departing from the spirit and scope thereof. Insofar as these changes and modifications are within the purview of the annexed claims, they are to be considered as part of our invention.

What is claimed is:

1. A process which comprises reacting 2,4-dihydroxy-3-methylphenacylamine with a compound of the formula:

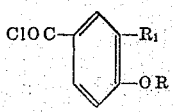

wherein R is a lower alkanoyl radical and $R_1$ is a member from the group consisting of 3-methyl-2-butenyl and 3-methylbutyl, in the presence of an acid acceptor to produce a compound of the formula:

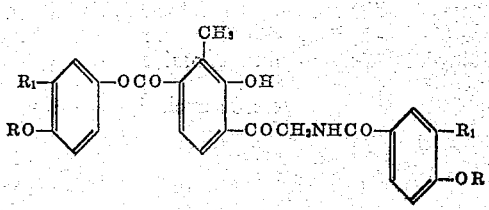

reacting this compound with an alkali to produce a compound of the formula:

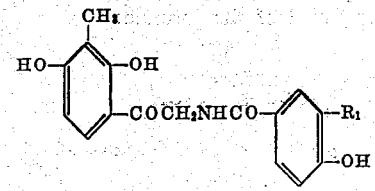

reacting this compound with 1-chloro - 2 - O - acyl - 3 - O-carbamylnoviose in the presence of silver oxide to produce a compound of the formula:

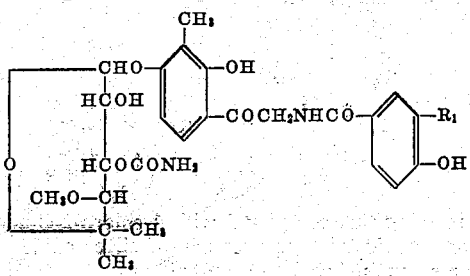

and reacting this compound with a lower alkyl carbonate in the presence of an alkali metal to produce a compound of the formula:

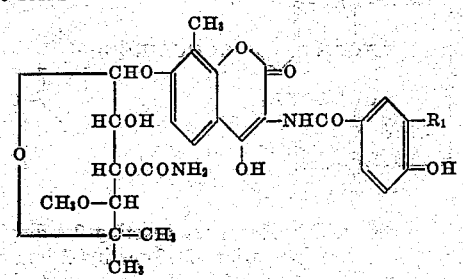

2. A process which comprises reacting 2,4-dihydroxy-3-methylphenacylamine with 4-acetoxy-3-(3-methyl-2-butenyl)-benzoyl chloride in the presence of pyridine to produce N-[4-acetoxy-3-(3-methyl-2-butenyl) - benzoyl]-2-hydroxy-3-methyl-4-(4-acetoxy-3-[3-methyl-2-butenyl]-benzoyloxy)-phenacylamine, treating this product with sodium hydroxide to produce N-(4-hydroxy-3-[3-methyl-2 - butenyl] - benzoyl) - 2,4-dihydroxy-3-methylphenacylamine, reacting this compound with 1-chloro-2-O-acetyl-3-O-carbamylnoviose in the presence of silver oxide to produce N-(4-hydroxy-3-[3-methyl-2-butenyl]-benzoyl)-2-hydroxy-3-methyl-4-(3-O-carbamylnoviosyloxy) - phenacylamine, and reacting this compound with a lower alkyl carbonate in the presence of sodium to produce novobiocin.

3. A process which comprises reacting 2,4-dihydroxy-3-methylphenacylamine with 3-(3-methylbutyl)-4-acetoxy-benzoyl chloride in the presence of pyridine to produce N - [4 - acetoxy-3-(3-methylbutyl)-benzoyl]-2-hydroxy-3-methyl-4-(4-acetoxy-3-[3-methylbutyl] - benzoyloxy)-phenacylamine, treating this product with sodium hydroxide to produce N-(4-hydroxy-3-[3-methylbutyl]-benzoyl)-2,4-dihydroxy-3-methylphenacylamine, reacting this compound with 1-chloro-2-O-acetyl-3-O-carbamylnoviose in the presence of silver oxide to produce N-(4-hydroxy-3-[3-methyl - butyl]-benzoyl)-2-hydroxy-3-methyl-4-(3-O-carbamylnoviosyloxy)-phenacylamine, and reacting this compound with a lower alkyl carbonate in the presence of sodium to produce dihydronovobiocin.

4. A process which comprises reacting 2,4-dihydroxy-3-methylphenacylamine with a compound of the formula:

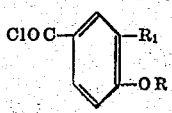

wherein R is a lower alkanoyl radical and $R_1$ is a member from the group consisting of 3-methyl-2-butenyl and 3-methylbutyl, in the presence of an acid acceptor to produce a compound of the formula:

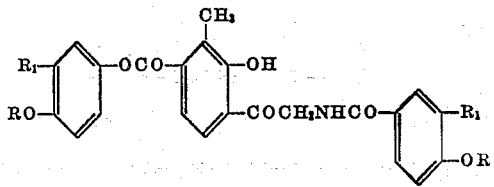

reacting this compound with an alkali to produce a compound of the formula:

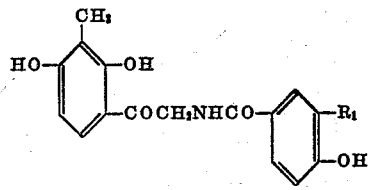

and reacting this compound with 1-chloro-2-O-acyl-3-O-carbamylnoviose in the presence of silver oxide to produce a compound of the formula:

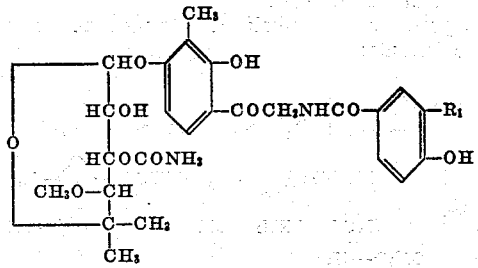

5. A process which comprises reacting 2,4-dihydroxy-3-methylphenacylamine with 3-(3-methyl-2-butenyl)-4-acetoxy-benzoyl chloride in the presence of pyridine to produce N-[4-acetoxy-3-(3-methyl-2-butenyl)-benzoyl]-2 - hydroxy - 3 - methyl - 4 - (4 - acetoxy - 3 - [3-methyl-2-butenyl]-benzoyloxy)-phenacylamine, treating this product with sodium hydroxide to produce N-(4-hydroxy - 3 - [3 - methyl - 2 - butenyl] - benzoyl) - 2,4-dihydroxy-3-methylphenacylamine, and reacting this compound with 1-chloro-2-O-acetyl-3-O-carbamylnoviose in the presence of silver oxide to produce N-(4-hydroxy-3 - [3 - methyl - 2 - butenyl] - benzoyl) - 2 - hydroxy - 3-methyl-4-(3-O-carbamylnoviosyloxy)-phenacylamine.

6. A process which comprises reacting 2,4-dihydroxy-3-methylphenacylamine with 3-(3-methylbutyl)-4-acetoxy-benzoyl chloride in the presence of pyridine to produce N - [4 - acetoxy - 3 - (3 - methylbutyl) - benzoyl] - 2 - hydroxy - 3 - methyl - 4 - (4 - acetoxy - 3 - [3-methylbutyl]-benzoyloxy)-phenacylamine, treating this product with sodium hydroxide to produce N-(4-hydroxy-3 - [3 - methylbutyl] - benzoyl) - 2,4 - dihydroxy - 3-methylphenacylamine, and reacting this compound with 1-chloro-2-O-acetyl-3-O-carbamylnoviose in the presence of silver oxide to produce N-(4-hydroxy-3-[methylbutyl]-benzoyl) - 2 - hydroxy - 3 - methyl - 4 - (3 - O - carbamylnoviosyloxy)-phenacylamine.

7. A compound of the formula:

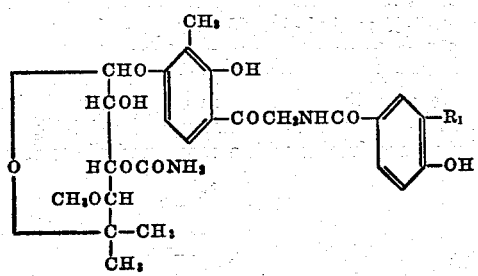

wherein $R_1$ is a member from the group consisting of 3-methyl-2-butenyl and 3-methylbutyl.

8. N - (4 - hydroxy - 3 - [3 - methyl - 2 - butenyl]-benzoyl) - 2 - hydroxy - 3 - methyl - 4 - (3 - O - carbamylnoviosyloxy)-phenacylamine.

9. N - (4 - hydroxy - 3 - [3 - methylbutyl] - benzoyl)-2 - hydroxy - 3 - methyl - 4 - (3 - O - carbamylnoviosyloxy)-phenacylamine.

10. A process which comprises reacting 2,4-dihydroxy-3-methylphenacylamine with a compound of the formula:

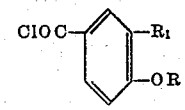

wherein R is a lower alkanoyl radical and $R_1$ is a member from the group consisting of 3-methyl-2-butenyl and 3-methylbutyl, in the presence of an acid acceptor to produce a compound of the formula:

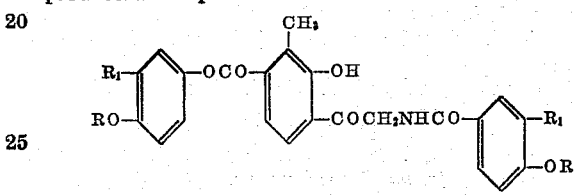

reacting this compound with an alkali to produce a compound of the formula:

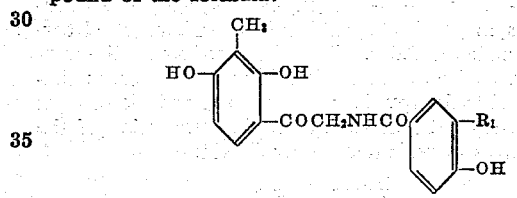

11. A process which comprises reacting 2,4-dihydroxy-3-methylphenacylamine with 3-(3-methyl-2-butenyl)-4-acetoxybenzoylchloride in the presence of pyridine to produce N-[4-acetoxy-3-(3-methyl-2-butenyl)-benzoyl]-2-hydroxy - 3 - methyl - 4 - (4 - acetoxy - 3 - [3 - methyl-2-butenyl]-benzoyloxy)-phenacylamine, treating this product with sodium hydroxide to produce N-(4-hydroxy-3 - [3 - methyl - 2 - butenyl] - benzoyl) - 2,4-dihydroxy-3-methylphenacylamine.

12. A process which comprises reacting 2,4-dihydroxy-3-methylphenacylamine with 3-(3-methylbutyl)-4-acetoxybenzoyl chloride in the presence of pyridine to produce N - [4 - acetoxy - 3 - (3 - methylbutyl) - benzoyl] - 2-hydroxy - 3 - methyl - 4 - (4 - acetoxy - 3 - [3 - methylbutyl]-benzoyloxy)-phenacylamine, treating this product with sodium hydroxide to produce N-(4-hydroxy-3-[3-methylbutyl] - benzoyl) - 2,4 - dihydroxy - 3 - methylphenacylamine.

13. A compound of the formula:

wherein $R_1$ is a member from the group consisting of 3-methyl-2-butenyl and 3-methylbutyl.

14. N - (4 - hydroxy - 3 - [3 - methyl - 2 - butenyl]-benzoyl)-2,4-dihydroxy-3-methylphenacylamine.

15. N - (4 - hydroxy - 3 - [3 - methylbutyl] - benzoyl)-2,4-dihydroxy-3-methylphenacylamine.

No references cited.